United States Patent
Sekine et al.

(10) Patent No.: US 6,908,050 B2
(45) Date of Patent: Jun. 21, 2005

(54) ELECTROMAGNETIC FUEL INJECTION VALVE

(75) Inventors: Atsushi Sekine, Hitachinaka (JP); Kiyotaka Ogura, Hitachinaka (JP); Ryuya Ando, Hitachi (JP); Makoto Yamakado, Tsuchiura (JP); Noriyuki Maekawa, Nihari (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/751,903

(22) Filed: Jan. 7, 2004

(65) Prior Publication Data

US 2004/0135014 A1 Jul. 15, 2004

Related U.S. Application Data

(63) Continuation of application No. 09/944,597, filed on Sep. 4, 2001, now Pat. No. 6,695,233.

(30) Foreign Application Priority Data

Oct. 17, 2000 (JP) .................................. 2000-356774

(51) Int. Cl.$^7$ .............................. B05B 1/30; F02M 59/00
(52) U.S. Cl. ................................ 239/585.1; 239/585.5; 239/533.2; 239/533.3; 239/88
(58) Field of Search ..................... 239/585.1–585.5, 239/533.2, 533.3, 533.12, 461, 463, 469, 483, 492, 88–93

(56) References Cited

U.S. PATENT DOCUMENTS

| | | | | |
|---|---|---|---|---|
| 4,292,947 A | * | 10/1981 | Tanasawa et al. ........... 123/445 |
| 5,169,066 A | * | 12/1992 | Ricco et al. .................... 239/96 |
| 5,544,816 A | * | 8/1996 | Nally et al. .............. 239/585.5 |
| 5,692,723 A | * | 12/1997 | Baxter et al. .......... 251/129.21 |
| 5,769,391 A | * | 6/1998 | Noller et al. .......... 251/129.21 |
| 5,803,361 A | * | 9/1998 | Horiuchi et al. .............. 239/88 |
| 5,944,262 A | * | 8/1999 | Akutagawa et al. ..... 239/585.4 |
| 6,003,791 A | * | 12/1999 | Reiter ......................... 239/575 |
| 6,079,642 A | | 6/2000 | Maier |
| 6,202,936 B1 | * | 3/2001 | Frick .............................. 239/5 |
| 6,257,496 B1 | * | 7/2001 | Wyant ........................... 239/5 |

FOREIGN PATENT DOCUMENTS

| | | |
|---|---|---|
| JP | 07-103099 | 4/1995 |
| JP | 10-339240 | 12/1998 |
| JP | 11-132127 | 5/1999 |
| JP | 11-166461 | 6/1999 |

\* cited by examiner

*Primary Examiner*—Davis Hwu
(74) *Attorney, Agent, or Firm*—Crowell & Moring LLP

(57) ABSTRACT

A press-machined fuel induction pipe 40, a hollow tubular type of fixed core 1 with a flange at its upper end, and a nozzle holder 18 that was press-machined into a slender tubular shape and has an orifice plate equipped with a valve seat at the lower end of the nozzle holder, are connected by welding. The upper inner surface of nozzle holder 18 and the outer surface of fixed core 1 are welded after being press-fit. A movable core 14 and a valve body 16 are connected to the welded assembly via a point 15 having a spring function. On the outer surface of nozzle holder 18 is provided an electromagnetic coil 2, the outside of which is provided with a tubular yoke 4 whose upper end is connected by welding to the flange 1*a* of fixed core 1 and whose lower end is press-fit on the outer surface of nozzle holder 18.

8 Claims, 9 Drawing Sheets

ELECTROMAGNETIC FUEL INJECTION VALVE

CROSS REFERENCE TO RELATED APPLICATIONS

This application is a continuation of U.S. application Ser. No. 09/944,597 filed Sep. 4, 2001 issued on Jan. 9, 2004 (U.S. Pat. No. 6,695,233).

FIELD OF THE INVENTION

The present invention relates to electromagnetic fuel injection valves for use in internal combustion engines.

BACKGROUND OF THE INVENTION

In conventional internal combustion engines for automobile use, an electromagnetic fuel injection valve driven by the electrical signals sent from the engine control unit is commonly used.

This type of fuel injection valve is constructed so that: an electromagnetic coil and a yoke are arranged around a hollow tubular type of fixed core (center core); a nozzle body containing a needle equipped with a valve body is installed at the bottom of the yoke which accommodates the electromagnetic coil, and; the needle is energized towards the valve seat by the action of the return spring.

Proposed an example of such a conventional electromagnetic fuel injection valve is, as disclosed in, for example, Japanese application patent laid-open publication No. Hei-10-339240 or Hei-11-132127, a single one into which a magnetic fuel connector portion, a non-magnetic intermediate pipe portion, and a magnetic valve body portion were molded by magnetizing one pipe formed of a composite magnetic material and then non-magnetizing only the intermediate portion of this pipe by use of, for example, induction heating, in order to reduce the number of parts and facilitate the assembly of the parts.

For this type, a cylindrical fixed core is press-fit in a fuel connector portion and a movable core with a valve body is mounted in the valve body portion. Also, an electromagnetic coil is provided on the intermediate periphery of the pipe and a yoke is provided outside the electromagnetic coil. When power is supplied to the electromagnetic coil, a magnetic circuit is formed over the area from the yoke to the fuel connector portion, the fixed core, the movable core, the valve body portion, and the yoke, and the movable core is magnetically attracted towards the fixed core. The non-magnetic portion functions as a magnetic flux short-circuiting suppressor between the fuel connector portion and the valve body portion.

SUMMARY OF THE INVENTION

In recent years, even in a gasoline engine, a fuel injection valve that directly injects a fuel into the cylinders of the internal combustion engine is placed in practical use.

A so-called "long nozzle type of injector" having a thin and long nozzle body at the bottom of its yoke is also proposed for the direct injection type of fuel injection valve mentioned above. When this long nozzle injector is installed on the cylinder head of an engine, if the periphery of the cylinder head is crowded with parts such as an air intake valve and an air intake pipe, only the slender nozzle body which does not take too large a space can be positioned on the cylinder head and the yoke, the connector mold, and other large-diameter valve portions can be spaced from other parts and the cylinder head to avoid interference. Therefore, this type of injector has the advantage that the flexibility of its installation is very high.

An object of the present invention is to supply a compact, electromagnetic fuel injection valve reduced in dimensions, especially in diameter, provided with an inexpensive and sufficient magnetic circuit, and excellent in performance, so as to make the main unit of the fuel injection valve suitable for injection schemes such as the direct intra-tubular injection scheme set forth above.

Another object of the present invention is to supply an electromagnetic fuel injection valve capable of suppressing the restitution of a closed valve body and preventing the occurrence of problems such as secondary fuel injection.

In order to accomplish the objects mentioned above, various inventions are proposed herein. The essentials of these inventions are described below.

An electromagnetic fuel injection valve basically having, as the major elements constituting the fuel flow channel in the axial direction of the injection valve body, a fuel induction pipe, a hollow tubular type of fixed core equipped with a flange at its-top end, and a nozzle holder that was press-machined into a slender and tubular shape using a pipe and has an orifice plate equipped with a valve seat at the lower end of said nozzle holder, is characterized in that:

said pipe is connected by welding to the top of the flange of the fixed core mentioned above, the upper inner surface of said nozzle holder and the outer surface of the fixed core are connected by press-fitting and welding, and one fuel flow channel assembly is thus constituted, said fuel flow channel assembly contains a needle connecting a movable core to the valve body, a return spring for energizing this needle in the direction of said valve seat, and a member for adjusting the spring action of said return spring, and an electromagnetic coil is provided at a peripheral position on said nozzle holder at which the nozzle holder and the fixed core are press-fit, and outside the electromagnetic coil is positioned a tubular yoke whose upper end is connected by welding to the flange of the fixed core and whose lower end is press-fit on the outer surface of the nozzle holder.

Also, an electromagnetic fuel injection valve having a needle equipped with a valve body, a return spring for applying a spring load to the valve seat side of said needle, an electromagnetic coil, and a magnetic circuit for magnetically attracting said needle in the opening direction of the valve by the excitation of said electromagnetic coil, is characterized in that:

said needle has a movable core operating as an element of said magnetic circuit, said movable core and said valve body are connected via a joint having a spring function, a plate spring is built into said needle, and an axially movable mass body is positioned, independently of said needle, between said return spring and said plate spring.

DETAILED DESCRIPTION OF THE DRAWINGS

DETAILED EXPLANATION OF THE PREFERRED EMBODIMENTS

Figure 1:
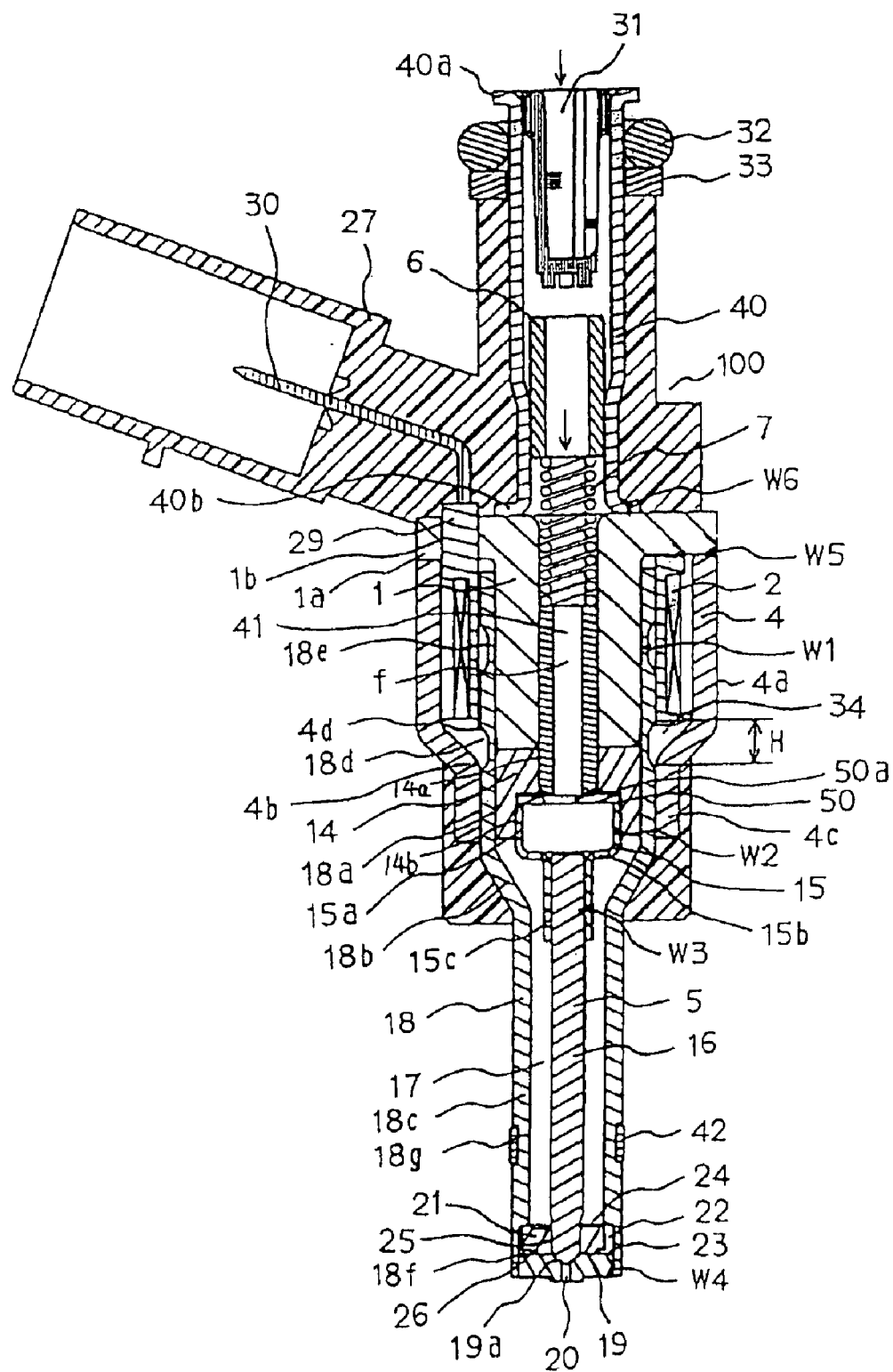
FIG. 1 is a longitudinal section of the fuel injection valve pertaining to an embodiment of the present invention.
Figure 2:
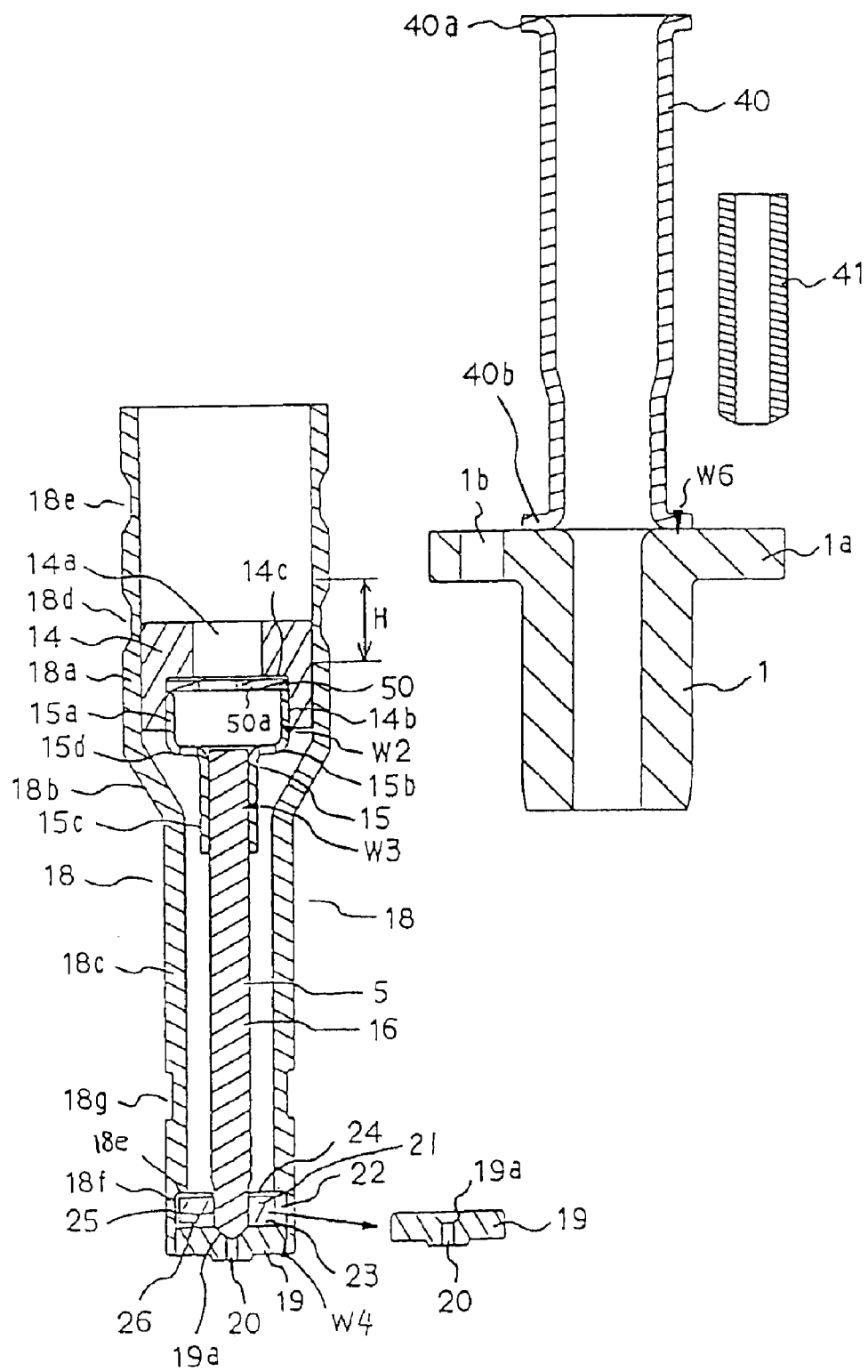
FIG. 2 is a partly exploded, longitudinal section of the above-mentioned fuel injection valve.
Figure 3:
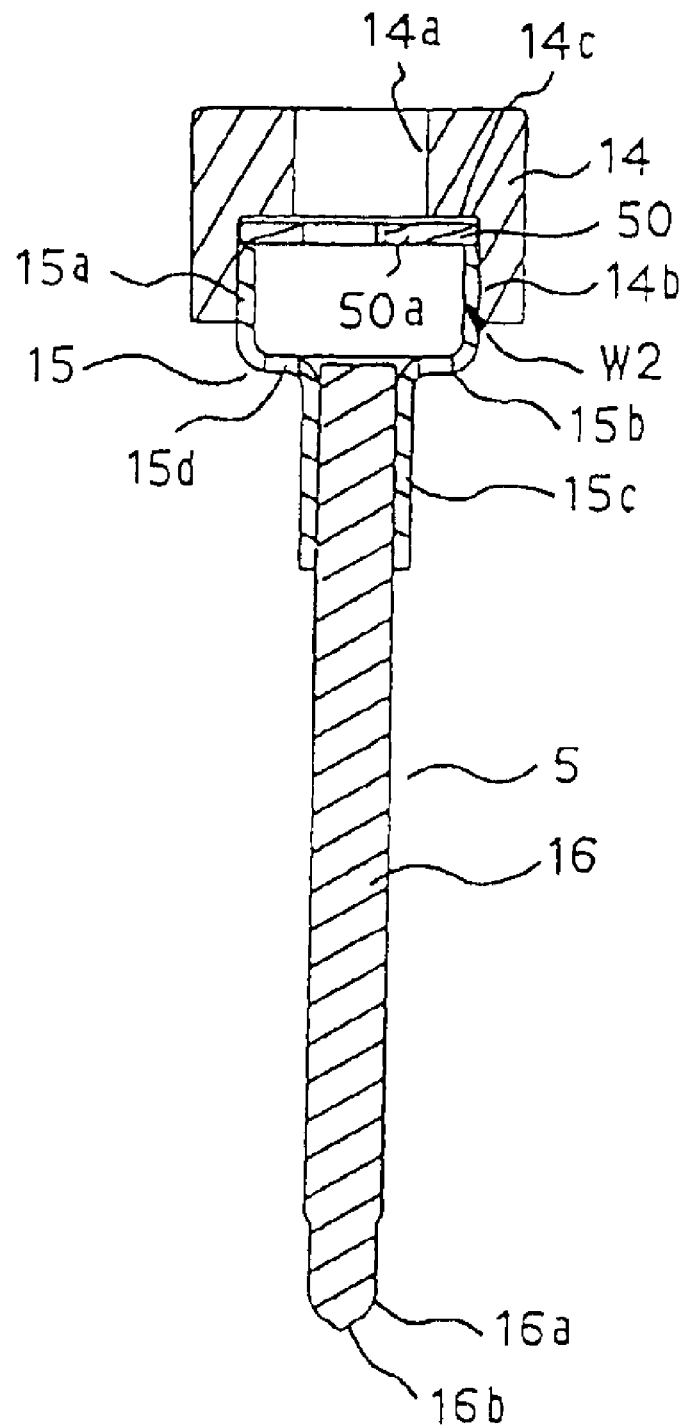
FIG. 3 is a longitudinal section of the needle of the above-mentioned fuel injection valve.
Figure 4:
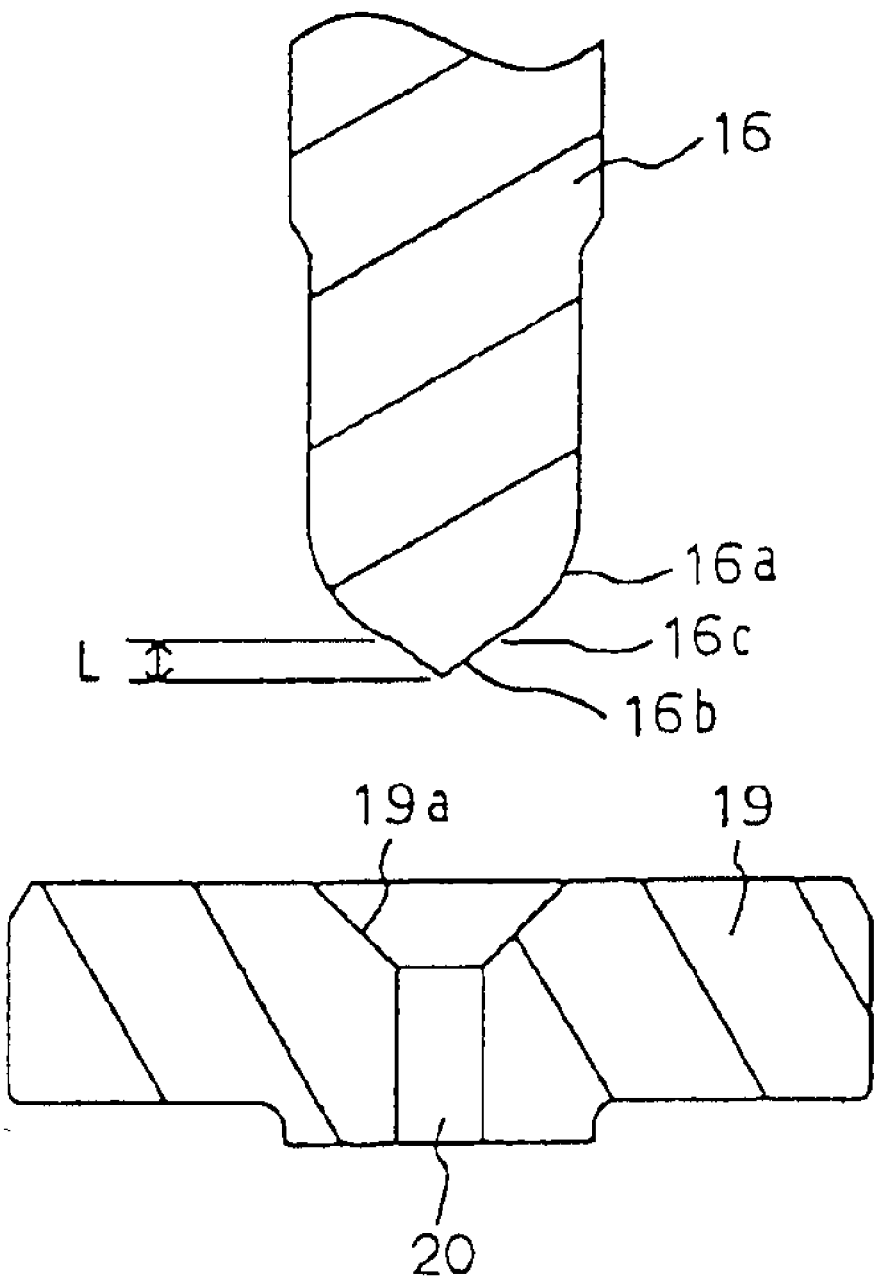
FIG. 4 is an enlarged, sectional view of the valve body and orifice plate used in the above-mentioned embodiment.
Figure 5:
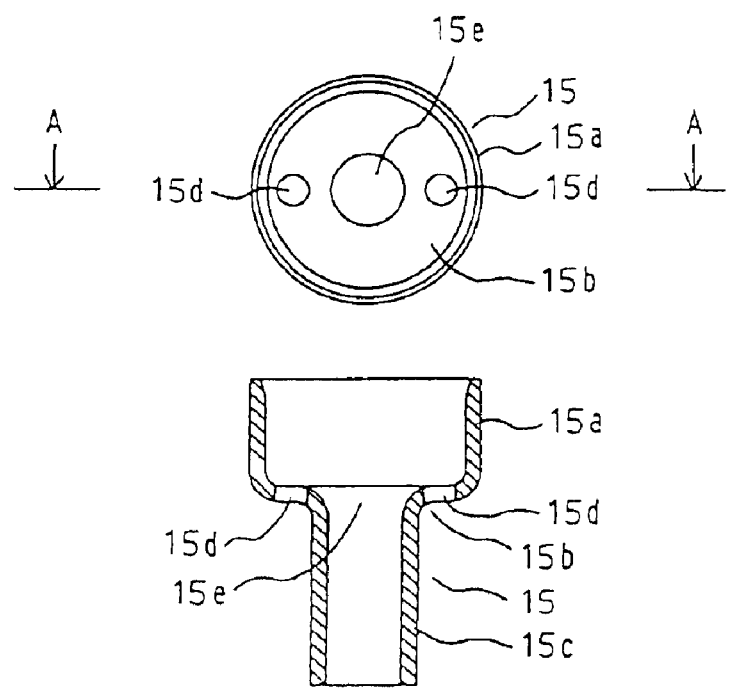
FIG. 5 is a top view and A–A' sectional view of the joint pipe used in the above-mentioned embodiment.

Embodiments of the present invention are described below using drawings. FIG. 1 shows in longitudinal section the fuel injection valve pertaining to an embodiment of the present invention. FIGS. 2 and 3 show the fuel injection valve in partly exploded, longitudinal section. FIG. 4 is an enlarged sectional view of the valve body and orifice plate used in the aforementioned embodiment. FIGS. 5 to 9 show the components used in the embodiment. FIG. 10 is an exploded diagonal view of the entire fuel injection valve.

First, a total outline of this embodiment is given below. FIG. 1 exemplifies a fuel injection valve 100 that employs the so-called "top feed scheme", in which, as shown by the arrow in the figure, when the injection valve is opened, fuel flows from the top of the valve body in its axial direction and is injected from an orifice 20 provided at the lower end of the injection valve.

Fuel injection valve 100 has, as the major elements constituting the fuel flow channel in the axial direction of the valve body; a fuel induction pipe 40 that was press-machined (this also applies when the other components mentioned below are press-machined during, for example, deep drawing or extrusion processes); a hollow tubular type of fixed core 1 with a flange 1a at its upper end, and; a nozzle holder 18 (this may also be termed a nozzle body) that was press-machined into a thin and long tubular shape using a pipe and has an orifice plate 19 equipped with a valve seat at the lower end of the nozzle holder.

As shown in FIGS. 2 and 3, fuel induction pipe 40 is provided with flanges 40a and 40b at its upper and lower ends, respectively, and flange 40b at the lower end is welded to the top of flange 1a of fixed core 1, at the section denoted by numeral W6. The welding is provided in the circumferential direction of the flange, and thereby, fixed core 1 and fuel induction pipe 40 are connected before the injection valve body is assembled.

The upper inner surface of nozzle holder 18 and the outer surface of fixed core 1 are press-fit, and furthermore, the section denoted by numeral W1 is welded over its entire periphery to connect nozzle holder 18 and fixed core 1. In this way, pipe 40, fixed core 1, and nozzle holder 18 are connected together to form a single fuel flow channel assembly.

This fuel flow channel assembly contains elements such as; a needle 5 that connects a cylindrical movable core and the slender valve body (valve rod included) via the joint pipe 15 mentioned later; a return spring 7 for energizing the needle 5 in the direction of valve seat 19a, and; a member 6 for adjusting the spring action of return spring 7 (in the present embodiment, this member is shown as a C-ring pipe whose cross section has the shape of a C-ring).

An electromagnetic coil 2 is provided in a position on the periphery of nozzle holder 18 at which the nozzle holder and fixed core 1 are press-fit, and a tubular yoke 4 is positioned outside the electromagnetic coil.

Yoke 4 is of a press-machined tubular shape (details of this shape are described later). The upper end of the yoke has a accommodation hole for electromagnetic coil 2, and the upper fringe of this hole is connected by being welded over the entire periphery to the flange 1a of fixed core 1, at the position denoted by numeral W5. The lower end portion 4c of yoke 4 is reduced in thickness, compared with electromagnetic coil storage element 4a, and the lower end portion 4c is press-fit on the periphery of nozzle holder 18.

This fuel injection valve 100 is constructed so that when power is supplied to electromagnetic coil 2, a magnetic circuit is formed by yoke 4, fixed core 1, movable core 14, and a portion of nozzle holder 18, and thereby, needle 5 overcomes the action of return spring 7 and is magnetically attracted to open the valve. When the power to electromagnetic coil 2 is interrupted, needle 5 is pressed against valve seat 19a by the action of return spring 7, thus closing the valve. In this embodiment, the lower edge of fixed core 1 functions as a stopper for stopping the movement of needle 5 when the valve is opened.

Features of the components mentioned above are set forth below. Fixed core 1 is made of magnetic stainless steel, and is press-machined and cut into a thin and long hollow cylindrical shape having a flange 1a at its upper end.

Flange 1a is provided with a window 1b for routing the terminal 29 and pin terminal 30 of electromagnetic coil 2. Fuel induction pipe 40 is formed of a non-magnetic metal member, the bottom of which is reduced in thickness by press-machining and a C-ring pin 6 having a C-shaped cross section is press-fit on the lower inner surface of the pipe. Load adjustment of return spring 7 is accomplished by adjusting the press-fitting allowance of pin 6. A fuel filter 31 is mounted at the upper end of fuel induction pipe 40.

Although nozzle holder 18 is a magnetic material, its peripheral portion at which the lower edge of fixed core 1 is positioned (in this embodiment, the position where annular groove 18d is provided) is provided with non-magnetizing or weak-magnetizing processes by induction hardening (hereinafter, non-magnetizing and weak-magnetizing processes are referred to as the same).

The non-magnetizing process mentioned above is provided near the lower edge (magnetic attraction surface) of fixed core 1, in other words, an area in which, at nozzle holder 4, width (slightly greater than the annular groove width H in FIG. 1) is given in a vertical direction around the position at which a perpendicular line crosses vertically to the axial line of fixed core 1, at the lower end of the fixed core. The peripheral surface of the nozzle holder in this area is provided with an annular groove 18d which has a trapezoidal cross section.

Annular groove 18d mentioned above is provided to minimize, along with the non-magnetizing process mentioned above, magnetic flux leakage into the magnetic circuit formed to magnetically attract the needle 5. That is to say, a portion of the nozzle holder 18 in this embodiment [the vicinity of the lower edge (magnetic attraction surface) of fixed core ] is non-magnetized to prevent magnetic flux leakage into the magnetic circuit near the lower edge of fixed core 1 and thus to ensure that magnetic fluxes flow intensively from fixed core 1 to movable core 14. However, even when non-magnetization is provided, complete non-magnetization is difficult and part of the magnetic flux leaks more or less into the non-magnetized area as well. In order to minimize such leakage, the thickness of nozzle holder 18 is reduced via annular groove 18d to obtain higher magnetic resistance.

The thickness of the portion of nozzle holder 18 where fixed core is press-fit, and the thickness of holder top 18a for accommodating movable core 14 are the greatest in the entire nozzle holder, and intermediate portion 18b at which the connection between movable core 14 and valve body 16 is positioned is formed into tapered form. Furthermore, holder bottom 18c at which the valve body at the bottom of the above-mentioned intermediate portion is located is constructed into a thin and long shape, thus forming the so-called "long nozzle type" of nozzle holder 18.

In addition to annular groove 18d mentioned above, an annular groove 18e spacedly above annular groove 18d is provided on the periphery of holder top 18a. The numeral W1 at annular groove 18e denotes the welded section between nozzle holder 18 and fixed core 1, and at this W1 position, nozzle holder 18 is welded over the entire periphery of fixed core 1. The W1 weld serves as a seal between nozzle holder 18 and the inner surface of fixed core, thereby preventing the leakage of the fuel flowing through injection valve body 100.

Also, since annular groove 18e is provided at weld W1, it is possible to weld the thin portion of nozzle holder 18 and save the thermal energy required for welding, and thereby to prevent the components of the injection valve body from suffering thermal deformation due to the welding heat.

On the periphery of the holder bottom (so-called the long nozzle), a groove 18g for installing a sealing member is provided and a sealing member 42 (for example, a Teflon seal) is mounted in the groove 18g.

Figure 11:
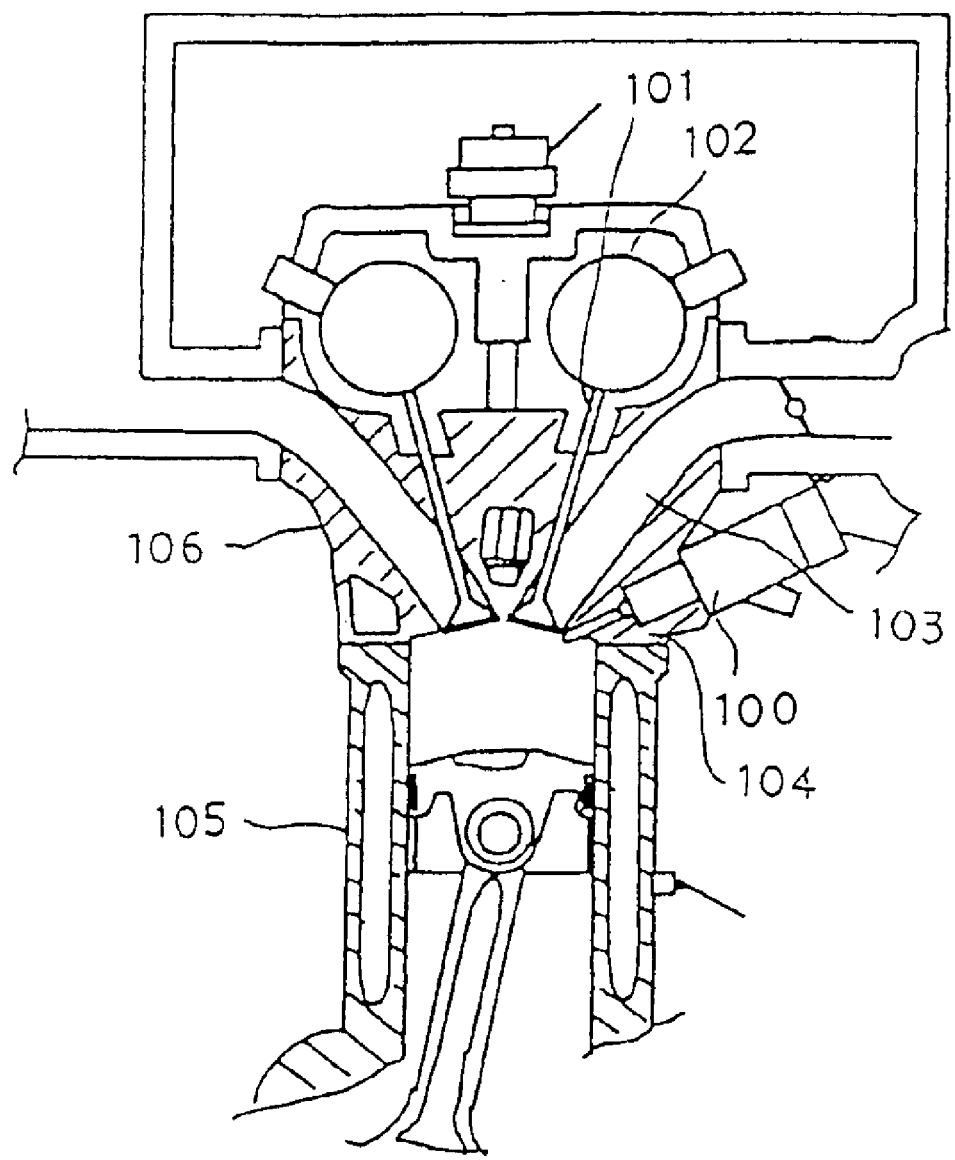
FIG. 11 is an explanatory view showing the mounting status of the fuel injection valve pertaining to the above-mentioned embodiment.

For this long nozzle 18c, when the mounting density of an air intake valve 101, an air intake/exhaust valve drive 102, an air intake pipe, and more, is high in an injection scheme under which fuel injection valve 100 is to be installed directly on the cylinder-head 106 of an engine 105 as shown in FIG. 11, since the main large-size components of the injection valve can be spaced from the above-mentioned components and cylinder head 106, the nozzle 18c has the advantage that the flexibility of its installation is very high. Under prior art, when fuel injection valve 100 is installed on the cylinder head of an engine, gaskets are arranged between the bottom of the large-size yoke and the cylinder head to prevent combustion gas leakage from the engine. In the present embodiment, however, since seal ring 42 provided on the periphery of the slender "long nozzle" prevents combustion gas leakage from the engine by sealing the outer surface of long nozzle 18c and the inner surface of its insertion hole at the cylinder head side, the combustion gas pressure-receiving area can be reduced at that seal and thus the sealing member can be constructed into a compact and simplified shape and reduced in costs.

An orifice plate 19 and a fuel swirler 21 (hereinafter referred to simply as the swirler) are provided at the lower end of nozzle holder 18, and these members, 18, 19, and 21, are molded using other members.

Orifice plate 19 is formed using, for example, a stainless steel disc-shaped chip, in the center of which is provided an injection hole (orifice) 20, followed by a valve seat 19a formed upstream.

Orifice plate 19 is designed so that it can be press-fit into the inner lower end 18f of nozzle holder 18.

Swirler 21 is designed so that it can be fit into the inner lower end of nozzle holder 18, and is formed using a sintered alloy.

Figure 9A:
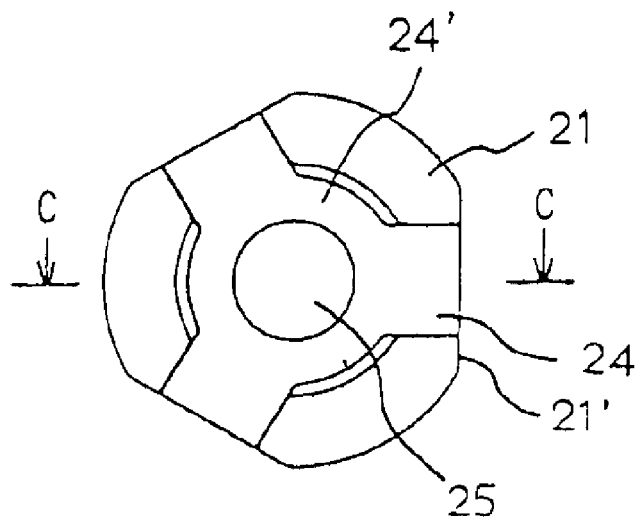
FIG. 9 is a top view, C–C' sectional view, and bottom view of the swirler used in the above-mentioned embodiment.
Figure 9B:
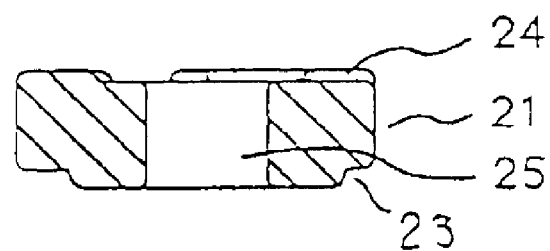
Figure 9C:
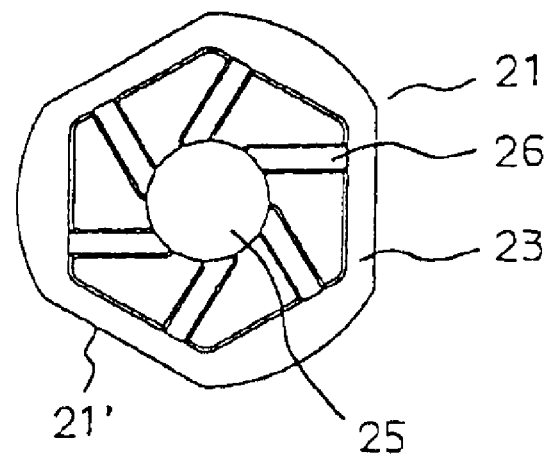
Figure 10:
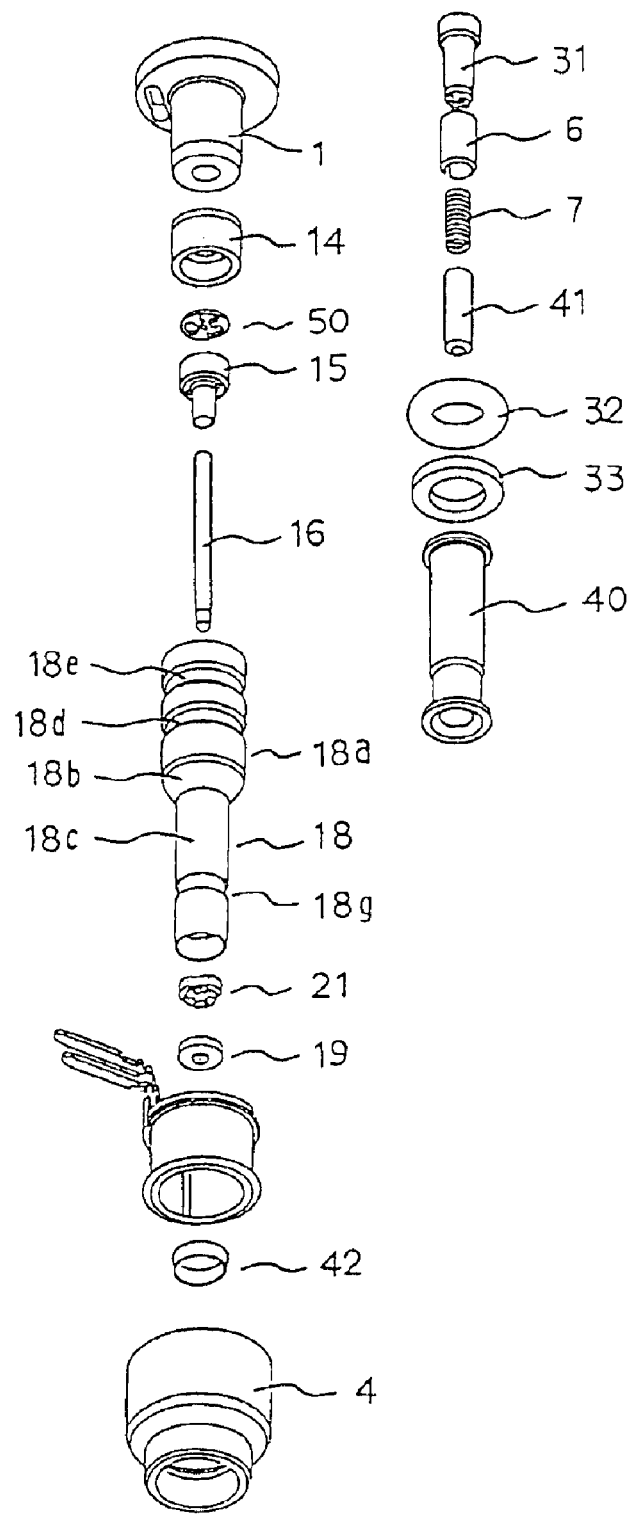
FIG. 10 is an exploded, diagonal view of the above-mentioned embodiment.

The detailed shape of swirler 21 is shown in FIG. 9. Its sub-figures (a), (b), and (c) are a top view, a sectional view of section C–C', and a bottom view, respectively.

Swirler 21 is a chip having a shape close to an equilateral triangle, and equipped with curves in three directions, instead of vertexes. A center hole (guide) 25 for slidably guiding the front end (valve body) of needle 5 is provided in the center of the chip, and guide grooves 24 for inducting the fuel to the peripheral sides 21' of the chip are formed radially and outward with an annular groove 24' as its center, are provided on the surface.

At the bottom of swirler 21, an annular step (flow channel) 23 is formed on its outer fringes are formed, and between annular flow channel 23 and center hole 25, multiple (for example, six) channel grooves 26 for swirling the fuel are arranged.

Channel grooves 26 are formed almost tangentially from the outside diameter of swirler 21 to the inside diameter so that when the fuel is injected, swirling force is applied thereto from channel grooves 26 towards the lower end of center hole 25.

The above-mentioned annular step 23 is provided because it is required for the fuel to stop flowing. Also, a trilateral chamfer 21' is formed on the periphery of swirler 21. When swirler 21 is fit into the front end of nozzle holder 18, the chamfer 21' ensures the flow of the fuel at the inner surface of nozzle holder 18 and functions as a reference position during the formation of grooves such s 24 and 26. The curved surfaces on the periphery of swirler 21 fit into the lower inner end of nozzle holder 18.

When the swirler 21 is shaped into a curved form close to an almost equilateral triangle as mentioned above, there is the advantage that the chip, compared with a more-sided one, can achieve a sufficient fuel flow rate.

An inner surface (stepped inner surface) 18f with a receiving face 18e for mounting the swirler 21 and the orifice plate 19 is provided at the lower end (one end at the fuel injection side) of nozzle holder 18. Swirler 21 is fit into the inner surface of the nozzle holder in such a manner that the swirler itself is accepted by the receiving face 18e of nozzle holder 18, and orifice plate 19 is press-fit and welded on said inner surface so as to press swirler 21 against receiving face 18e. Numeral W4 denotes the welding section, at which the welding is provided over the entire periphery of orifice plate 19.

In this way, swirler 21 and orifice plate 19 are mounted so that swirler 21 is held between receiving face 18e and orifice plate 19.

In order to be pressed firmly against receiving face 18e located on nozzle holder 18, the surface of swirler 21 is provided with fuel guide grooves 24, and the fuel at the upstream side of the swirler flows into the fuel flow channel 22 on the outer surface of the swirler via the grooves 24.

As shown in FIG. 3, the movable core 14 and valve body 16 at needle 5 are connected via a joint 15 having a spring function. Needle 5 contains a plate spring (damper plate) 50 between movable core 14 and joint 15.

Also, a mass body (also referred to as a heavy bob or movable measure) 41 that can be moved in its axial direction, independently of needle 5, is located in the area from an axial hole f, which constitutes the fuel flow channel of fixed core, to an axial hole provided in movable core 14. Mass body 41 is positioned between return spring 7 and plate spring 50. The spring load of return spring 7 is therefore applied to needle 5 via mass body 41 and plate spring 50.

As shown in FIGS. 2 and 3, movable core 14 has an upper axial hole 14a for inducting a portion of mass body 41, and a lower axial hole 14b having a thickness smaller than that of upper axial hole 14a.

Joint 15 consists of a single cup-shaped pipe into which upper tubular portion 15a and lower tubular portion 15c smaller than it in terms of thickness were formed. Upper tubular portion 15a fits into the lower axial hole 14b of movable core 14 and is welded over its entire periphery to movable core 14, at the position denoted by numeral W2, and thus the joint 15 and the movable core 14 are connected.

Plate spring 50 intervenes between the inner stepped surface 14c, which is further located between the upper axial hole 14a and lower axial hole 14b of movable core 14, and the upper edge of the upper tubular portion 15a of joint 15. The entire upper periphery of the valve body (valve rod) 5 of the needle is welded for connection to the lower tubular portion 15c of joint 15, at the position denoted by numeral W3.

Step 15b between the upper tubular portion 15a and lower tubular portion 15c of joint 15 functions as a plate spring.

Figure 6:
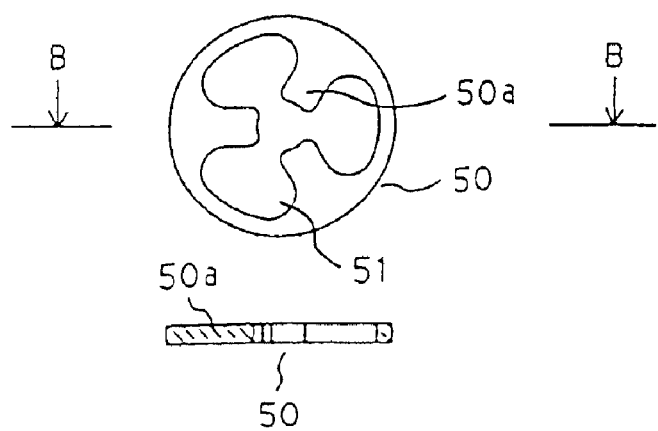
FIG. 6 is a top view and B–B' sectional view of the orifice plate used in the above-mentioned embodiment.

As shown in FIG. 6, plate spring 50 is annular and its inner portion denoted by numeral 51 is a punched-through portion. A plurality of elastic pieces 50a are eject-formed inward via the punched-through portion, and the elastic pieces 50a are arranged at equal intervals in their circumferential direction.

The elastic pieces 50a of the plate spring 50 support the lower end of cylindrical movable mass body 41.

In this embodiment, since plate spring 50 supports mass body (first mass body) 41 and the plate spring portion (stepped portion) 15b of the joint 15 supports movable core (second mass body) 14, the mass body and the plate spring function (damper function) that supports it are of double structure.

And when the fuel injection valve is closed, if needle 5 collides with valve seat 19a by the spring action of return spring 7, the resulting shock is absorbed by the plate spring portion 15b of joint 15 first and then the kinetic energy generated by the restitution of needle 5 is absorbed by the inertia of movable mass body 9 and the elastic deformation of plate spring 50 in order to prevent the restitution from actually occurring. Under the double damper structure, in particular, that is shown in this embodiment, even for the fuel injection valve of the intra-tubular injection scheme which creates significant spring load of return spring 7, secondary injection associated with the restitution of needle 5 can be effectively prevented by sufficiently attenuating the shock energy generated when the valve body is closed.

An enlarged structural view of the joint 15 mentioned above is shown as FIG. 5. Joint 15, together with the mass body 41 mentioned above, has its interior functioning as a fuel flow channel f, and a plurality of holes 15d for inducting the fuel into nozzle holder 18 are arranged at stepped portion 15d.

Portions of movable core 14 and valve rod 16 form a guide surface at the movable side. Also, the inner surface of the upper tubular portion 18a of nozzle holder 18 functions as a guide surface for slidably guiding the movable core 14, and the inner surface of the axial hole 25 in swirler 21 functions as a guide surface for slidably guiding the valve rod 16. Thus, the so-called "two-point support guide scheme" is constituted.

Yoke 4 is a press-machined, magnetic stainless steel material, and has a cylindrical coil storage element 4a for accommodating electromagnetic coil 2, a tapered throttle element 4b located directly under the storage element, and a cylindrical yoke bottom 4c located directly under the tapered throttle element.

The upper end of the yoke has a hole, through which electromagnetic coil 2 is accommodated and is supported and positioned at the curve 4b of the internal boundary between coil storage element 4a and tapered element 4b. The inner surface of yoke bottom 4c and a portion on the periphery of nozzle holder 18 are press-fit, and the annular clearance 34 surrounded by the bobbin bottom of electromagnetic coil 2, the inner surface of tapered element 4b, and the outer surface of nozzle holder 18, acts as an air gap to prevent magnetic flux leakage from the needle attraction magnetic circuit formed by fixed core 1, movable core 14, nozzle holder 18, and yoke 4.

In this embodiment, the stroke of needle 5 is provided for at valve seat 19a and the lower end of fixed core 1.

Since, for the above reason, the lower edge of fixed core 1 and the surface of movable core 14 collide during valve closing, the lower edge of fixed core 1 and the surface of movable core 14 are provided with hard coating (for example, chromium plating).

Figure 7:
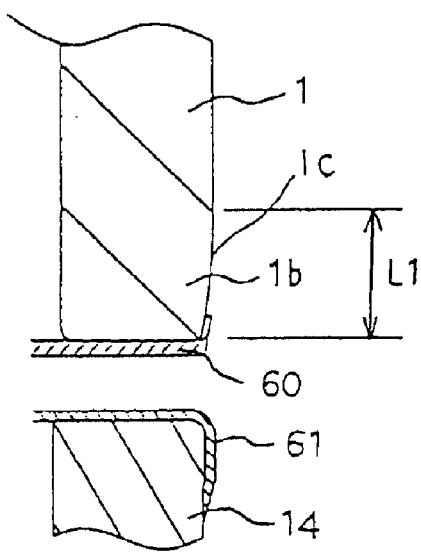
FIG. 7 is a partly enlarged, sectional view of the movable core and fixed core used in the above-mentioned embodiment.
Figure 8:
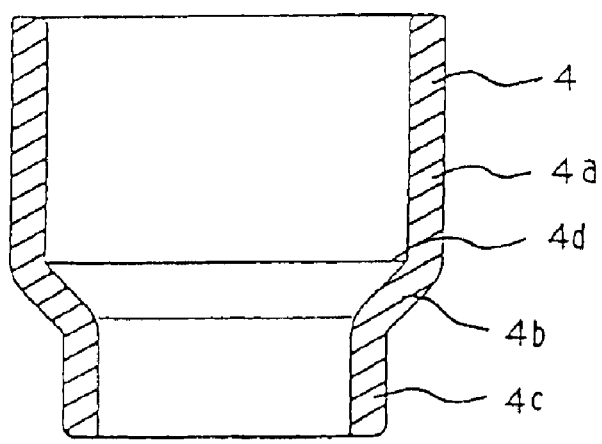
FIG. 8 is a longitudinal section of the yoke used in the above-mentioned embodiment.

As shown in FIG. 7, the lower end 1b of fixed core 1 has a curve 1c functioning as a curved guide surface for press-fitting into nozzle holder 18 (curve 1c is an area denoted by numeral L1 in FIG. 7, and in this embodiment, curve 1c has a curvature of about 12.5 mm). Since, in this way, the lower end 1b of fixed core 1 is tapered by being formed into curved guide surface 1c, a smooth press-fit can be guaranteed, compared with the case that the lower end of the fixed core is formed into a tapered shape. That is to say, for a tapered shape, since a wide-angle edge is formed at the crossing portion between the taper line and the straight line intersecting therewith, although the press-fit section of the nozzle holder is likely to scuff at the wide-angle edge during press-fitting, this problem does not occur in the present embodiment. Although the hard coating process 60 instituted at the lower edge of fixed core 1 extends to the lower side face of fixed core 1, the area from the lower edge of fixed core 1 to curved guide surface 1c (not overstepping the range of L1) is provided with hard coating for sufficient wear resistance and shock resistance so as not to cause trouble with press-fitting (more specifically, so that the outside diameter of the fixed core lower edge, including the thickness of hard coating, does not exceed the outside diameter of the straight portion of the fixed core).

As shown in FIG. 4, valve body 16 of needle 5 has a front end formed into a shape consisting of a combination of a spherical surface 16a and a conical protrusion 16b, and the spherical surface 16a and the conical protrusion 16b have a discontinuous portion shown as 16c. Spherical surface 16a is rested on valve seat 19a when the valve is closed. Since the contact surface on valve seat 19a is formed as spherical surface 16a, the occurrence of a clearance between the valve seat and the valve body is prevented, even when the valve body inclines. Conical protrusion 16b ensures smooth flow of the fuel by reducing the dead volume of orifice 20.

Also, the formation of the discontinuous portion mentioned above brings about the advantage that compared with the case that the conical portion and the spherical portion are made continuous, finishing by polishing can be made easy. Numeral 27 denotes a resin mold having a connector.

As shown in FIG. 2, fuel induction pipe 40 and fixed core 1 are welded beforehand. Under this state, the edge of fixed core 1 is provided with chromium plating 60.

Also, orifice plate 19 is press-fit and welded at the front end of nozzle holder 18 with swirler 21 in between, preassembled needle 5 is inserted into nozzle holder 18 (after being assembled, needle 5 is provided with chromium plating 61), and fixed core 1 is press-fit into this nozzle holder 18. The stroke of needle 5 is determined by the press-fitting allowance of fixed core 1. This press-fitting allowance of fixed core 1 is detected by a sensor, and when the required press-fitting allowance is reached, the press-fitting process is completed. After this, nozzle holder 18 and fixed core 1 are welded.

Next, electromagnetic coil 2 is threaded onto the outer surface of fixed core 1 via a bobbin, yoke 4 is press-fit from its axial direction into the upper tubular portion 18a of nozzle holder 18 (the press-fitting section is the lower end 4c of yoke 4), and the upper fringe of yoke 4 is welded onto the flange 1a of fixed core 1.

After that, the pin terminal 30 of the electromagnetic coil is bent and then provided with resin molding 27. Mass body 41, return spring 7, spring adjusting member 6, fuel filter 31, O-ring 32, and backup ring 33 are assembled in the final process.

According to the present embodiment, the following effects can be obtained:

(1) Fuel induction pipe 40, fixed core 1, and nozzle holder 18 are connected into a single unit by welding, and this unit is the fuel flow channel assembly in the present embodiment. By constituting the fuel flow channel assembly in this way, it is possible for only the fixed core 1, which is to operate as the main magnetic circuit, to be formed into a relatively thick shape to ensure a magnetic path, and for fuel induction pipe 40 to be formed into a thin shape using a non-magnetic pipe, since this induction pipe does not function as a magnetic path. It is also possible to reduce the thickness of nozzle holder 18 and to set the elements of the fuel flow channel assembly to the appropriate specifications according to the particular needs of each. In addition, the elements of the fuel flow channel assembly can be mass-produced at low costs by press-machining each.

(2) Furthermore, even when nozzle holder 18 is press-fit into fixed core 1, since yoke 4 and fixed core 1 are connected at weld W5, it is possible to minimize the magnetic gaps for electromagnetic valve actuation. Besides, at the magnetic path portion of fixed core 1, the section of the nozzle holder 18 that has been press-fit and welded at the magnetic path portion of the fixed core is added to this portion, and thus, magnetic flux leakage from the magnetic circuit is minimized at the position of annular groove 18d by collaboration between the presence of this groove 18d, the non-magnetizing process, and the presence of annular air gap 34, with the result that the magnetic fluxes flow intensively between the lower end of fixed core 1 and movable core 14 and enables the magnetic attraction characteristics of the electromagnetic valve to be improved.

(3) Also, since both the shock during the closing of the fuel injection valve and the restitution of the valve body is effectively minimized by double damper structure, secondary injection can be prevented more effectively than before.

In the embodiment set forth above, although the present invention is exemplified using the fuel injection valve of the intra-tubular injection scheme, the invention can also be applied to the fuel injection valve to be located on an air intake channel.

As set forth above, according to the present invention, it is possible to supply a compact, electromagnetic fuel injection valve reduced in dimensions, especially in diameter, provided with an inexpensive and sufficient magnetic circuit, and excellent in performance, so as to make the main unit of the fuel injection valve suitable for injection schemes such as the direct intra-tubular injection scheme described above:

What is claimed is:

1. A fuel injection valve comprising:

a valve seat member having a fuel injection hole, and a valve seat formed upstream of the fuel injection hole;

a swirler arranged in a fuel chamber having a cylindrical side wall upstream of said valve seat member to supply the fuel with swirling force;

wherein said swirler includes a first surface facing to said valve seat member and a second surface in opposition to the first surface;

wherein said swirler has a through hole formed at the center and bridging between the first and second surfaces;

wherein the side of said swirler has a plurality of plane surfaces arranged at equal interval each other around the side and same number of curved surfaces alternatively positioned each other;

wherein a polygonal protrusion surface with a plurality of sides are formed on the first surface and the protrusion has a swirling groove extending from each side of the protrusion to the through hole and opened at a position off-set with respect to the center; and wherein a radial groove extending radially from the through hole on the second surface and opened to the side surface.

2. A fuel injection valve according to claim 1, wherein said swirler has three plane surfaces and three curved surfaces at the side surface.

3. A fuel injection valve according to claim 1, wherein some sides of the polygon having a plurality of sides firmed on the first surface is formed each other parallel to the plane of the side of said swirler.

4. A fuel injection valve according to claim 1, wherein said swirler includes three plane surfaces and three curved surfaces at the side surface and the polygon formed on the surface and having a plurality of sides is hexagon.

5. A fuel injection valve according to claim 1, diameter of a circle in which the side surfaces of said swirler is inscribed is larger than that of a circle in which the side surfaces of the protrusion of the polygon formed on the second surfaces is inscribed.

6. A fuel injection valve according to claim 1, wherein the fuel chamber having the cylindrical peripheral wall is formed at the top portion of the injection valve.

7. A fuel injection valve to claim 1, wherein diameter of cylindrical side wall of the fuel chamber is larger than that of a circle in which the side surfaces of said swirler is inscribed.

8. A fuel injection valve according to claim 1, wherein the through hole guides the movement of the valve body in the axial direction.

* * * * *